US012380100B2

(12) United States Patent
Bergman et al.

(10) Patent No.: US 12,380,100 B2
(45) Date of Patent: Aug. 5, 2025

(54) EVALUATING AN INTERPRETATION FOR A SEARCH QUERY

(71) Applicant: Google LLC, Mountain View, CA (US)

(72) Inventors: Jeffrey Bergman, Irvine, CA (US); Pavlo Poliakov, Cupertino, CA (US); Matthew William Dawson, Thousand Oaks, CA (US); Kevin Rothi, Huntington Beach, CA (US); Chifeng Wen, Tustin, CA (US)

(73) Assignee: GOOGLE LLC, Mountain View, CA (US)

( * ) Notice: Subject to any disclaimer, the term of this patent is extended or adjusted under 35 U.S.C. 154(b) by 135 days.

(21) Appl. No.: 18/014,037

(22) PCT Filed: Dec. 10, 2020

(86) PCT No.: PCT/US2020/064234
§ 371 (c)(1),
(2) Date: Dec. 30, 2022

(87) PCT Pub. No.: WO2022/005511
PCT Pub. Date: Jan. 6, 2022

(65) Prior Publication Data
US 2023/0334045 A1   Oct. 19, 2023

Related U.S. Application Data

(60) Provisional application No. 63/047,039, filed on Jul. 1, 2020.

(51) Int. Cl.
*G06F 16/2453* (2019.01)
*G06F 16/242* (2019.01)
(Continued)

(52) U.S. Cl.
CPC ...... *G06F 16/24542* (2019.01); *G06F 16/243* (2019.01); *G06F 16/285* (2019.01); *G06N 20/00* (2019.01)

(58) Field of Classification Search
CPC .. G06F 16/243; G06F 16/24542; G06N 20/00
See application file for complete search history.

(56) References Cited

U.S. PATENT DOCUMENTS 9,536,522 B1   1/2017   Hall et al.
2016/0196336 A1   7/2016   Allen et al.
(Continued)

FOREIGN PATENT DOCUMENTS

CN   109523194   3/2019
CN   110990597   4/2020
(Continued)

OTHER PUBLICATIONS

Lewandowski ("Deriving query intents from web search engine queries", Journal of the American Society for Information Science and Technology, vol. 63, No. 9, Aug. 17, 2012) (Year: 2012).*
(Continued)

*Primary Examiner* — Apu M Mofiz
*Assistant Examiner* — Farhad Agharahimi
(74) *Attorney, Agent, or Firm* — DORITY & MANNING, P.A.

(57) ABSTRACT

A method for evaluating an interpretation for a search query is disclosed. The method includes receiving, by one or more processing circuits, a training dataset. The method includes training a first model utilizing the training dataset. The first model is trained to evaluate whether a human interpretation for a search query is correct. The method includes receiving a search query and a human interpretation for the search query. The method includes determining an initial evaluation of whether the human interpretation for the search query is
(Continued)

correct utilizing the first model. The method includes generating a second model utilizing the initial evaluation from the first model, temporal features relating to the search query, and cluster features relating to the search query, and determining a final evaluation of whether the human interpretation for the search query is correct utilizing the second model.

20 Claims, 10 Drawing Sheets

(51) Int. Cl.
  *G06F 16/28* (2019.01)
  *G06N 20/00* (2019.01)

(56) References Cited

U.S. PATENT DOCUMENTS

| | | | |
|---|---|---|---|
| 2017/0300533 A1 | 10/2017 | Zhang et al. | |
| 2019/0205794 A1* | 7/2019 | Hsu | G06N 20/20 |
| 2019/0311414 A1 | 10/2019 | Otsuka | |

FOREIGN PATENT DOCUMENTS

| | | |
|---|---|---|
| JP | 2009163303 | 2/2013 |
| JP | 2019191686 | 3/2019 |

OTHER PUBLICATIONS

Anderson ("A deep dive into BERT: How BERT launched a rocket into natural language understanding", https://searchengineland.com/a-deep-dive-into-bert-how-bert-launched-a-rocket-into-natural-language-understanding-324522, Dawn Anderson, Nov. 5, 2019) (Year: 2019).*

International Preliminary Report on Patentability for Application No. PCT/US2020/064234, mailed Jan. 12, 2023, 9 pages.

International Search Report and Written Opinion for Application No. PCT/US2020/064234, mailed Mar. 23, 2021, 9 pages.

Lewandowski et al., "Deriving Query Intents from Web Search Engine Queries", preprint—Journal of the American Society for Information Science and Technology, vol. 63, No. 9, 2012, 47 pages.

Chinese Search Report Corresponding to Application No. 2020801033909 on Oct. 14, 2024.

* cited by examiner

EVALUATING AN INTERPRETATION FOR A SEARCH QUERY

CROSS-REFERENCE TO RELATED APPLICATION

This application is based upon and claims the right of priority under 35 U.S.C. § 371 to International Application No. PCT/US2020/064234 filed on Dec. 10, 2020, which claims priority to U.S. Provisional Application Ser. No. 63/047,039, filed on Jul. 1, 2020. Applicant claims priority to and the benefit of each of such applications and incorporates all such applications herein by reference in their entirety.

BACKGROUND

In many systems, measuring the quality of the interpretation for the search query includes utilizing user interface interactions, such as a selection on a result of the search query, as a proxy for correctly interpreting the search query and providing appropriate results. However, in some implementations of answers to natural language search queries, the results to the search queries are designed in a panel as soon as the search query is entered. As such, interaction signals cannot be analyzed in order to gauge the quality of results provided in response to the search query. Another method of measuring the quality of answers to a search query is utilizing human evaluation to rate the quality of the answers. However, sending the interpretations of search queries and results to humans to manually rate quality can be expensive and time-consuming. Furthermore, using humans to evaluate the quality of an interpretation for a search query becomes exceedingly difficult when the search queries are scaled for a vast number of languages. Therefore, there exists a desire for predictive methods in evaluation of the accuracy of an interpretation for a natural language search query to increase efficiency, improve costs of assessing the quality of analytics data, and improve the quality of results returned by the search queries.

SUMMARY

One aspect of the present disclosure relates to a method for evaluating an accuracy of a human interpretation for a search query. The method may include receiving, by one or more processing circuits, a training dataset. The training dataset may include multiple past search queries, a human interpretation for each of the multiple past search queries, and a human-evaluated label for each of the multiple past search queries of whether the human interpretation was correct. The method may include training, by the one or more processing circuits, a first model utilizing the training dataset. The first model may be trained to evaluate whether a human interpretation for a search query is correct. The method may include receiving, by the one or more processing circuits, a search query, the search query including one or more words input via a user interface to request desired information, and receiving a human interpretation for the search query. The human interpretation may include one or more words defining an interpretation of the desired information. The method may include determining, by the one or more processing circuits, an initial evaluation of whether the human interpretation for the search query is correct utilizing the first model. The method may include generating, by the one or more processing circuits, a second model utilizing the initial evaluation from the first model, temporal features relating to the search query, and cluster features relating to the search query. The method may include determining, by the one or more processing circuits, a final evaluation of whether the human interpretation for the search query is correct utilizing the second model.

In some implementations of the method, the search query may be a first search query. In some implementations of the method, it may include determining, by the one or more processing circuits, whether the first search query is associated with a second search query received within a predetermined time interval after the first search query. In some implementations of the method, the method may include receiving, by the one or more processing circuits, token embeddings from the first model for each of the first and second search queries. In some implementations of the method, a token may be a word in a search query. In some implementations of the method, the method may include determining, by the one or more processing circuits, a vector sentence representation for each of the first and second search queries by averaging the token embeddings from the first model for each of the first and second search queries.

In some implementations of the method, the first model may be pre-trained on a set of natural language data and the first model may be trained utilizing the training dataset to tune the first model to a particular classification problem.

In some implementations of the method, the method may include parsing, by the one or more processing circuits, the first and second search queries using a distance algorithm. In some implementations of the method, the distance algorithm may be at least one of a Euclidean distance algorithm or a cosine similarity algorithm.

In some implementations of the method, the method may include determining, by the one or more processing circuits, whether the second search query is a search refinement of the first search query. In some implementations of the method, a search refinement may be a weighted indication of an incorrect human interpretation for the search query.

In some implementations of the method, the method may include generating, by the one or more processing circuits, clusters of search queries based at least in part on similarity between search queries in the clusters. In some implementations of the method, the method may include updating, by the one or more processing circuits, generated clusters in response to receiving new search queries.

In some implementations of the method, the method may include determining, by the one or more processing circuits, whether an input is received via the user interface to view a report for the search query. In some implementations of the method, the input to view a report in may be a weighted indication of a correct human interpretation for the search query.

Another aspect of the present disclosure relates to a system configured for evaluating an accuracy of a human interpretation for a search query. The system may include one or more hardware processors configured by machine-readable instructions. The processor(s) may be configured to receive, by one or more processing circuits, a training dataset. The training dataset may include multiple past search queries, a human interpretation for each of the multiple past search queries, and a human-evaluated label for each of the multiple past search queries of whether the human interpretation was correct. The processor(s) may be configured to train, by the one or more processing circuits, a first model utilizing the training dataset. The first model may be trained to evaluate whether a human interpretation for a search query is correct. The processor(s) may be configured to receive, by the one or more processing circuits, a search query, the search query including one or more words input via a user interface to request desired information, and to receive a human interpretation for the search query. The human interpretation may include one or more words defining an interpretation of the desired information. The processor(s) may be configured to determine, by the one or more processing circuits, an initial evaluation of whether the human interpretation for the search query is correct utilizing the first model. The processor(s) may be configured to generate, by the one or more processing circuits, a second model utilizing the initial evaluation from the first model, temporal features relating to the search query, and cluster features relating to the search query. The processor(s) may be configured to determine, by the one or more processing circuits, a final evaluation of whether the human interpretation for the search query is correct utilizing the second model.

In some implementations of the system, the search query may be a first search query. In some implementations of the system, the processor(s) may be configured to determine, by the one or more processing circuits, whether the first search query is associated with a second search query received within a predetermined time interval. In some implementations of the system, the processor(s) may be configured to receive, by the one or more processing circuits, token embeddings from the first model for each of the first and second search queries. In some implementations of the system, a token may be a word in a search query. In some implementations of the system, the processor(s) may be configured to determine, by the one or more processing circuits, a vector sentence representation for each of the first and second search queries by averaging the token embeddings from the first model for each of the first and second search queries.

In some implementations of the system, the first model may be pre-trained on a set of natural language data, and training the first model utilizing the training dataset tunes the first model to a particular classification problem.

In some implementations of the system, the processor(s) may be configured to parse, by the one or more processing circuits, the first and second search queries using a distance algorithm. In some implementations of the system, the distance algorithm may be at least one of a Euclidean distance algorithm or a cosine similarity algorithm.

In some implementations of the system, the processor(s) may be configured to determine, by the one or more processing circuits, whether the second search query is a search refinement of the first search query. In some implementations of the system, a search refinement is a weighted indication of an incorrect human interpretation for the search query.

In some implementations of the system, the processor(s) may be configured to generate, by the one or more processing circuits, clusters of search queries based at least in part on similarity between search queries in the clusters. In some implementations of the system, the processor(s) may be configured to update, by the one or more processing circuits, generated clusters in response to receiving new search queries.

In some implementations of the system, the processor(s) may be configured to determine, by the one or more processing circuits, whether an input is received via the user interface to view a report for the search query. In some implementations of the system, the input to view a report may be a weighted indication of a correct human interpretation for the search query.

Yet another aspect of the present disclosure relates to a non-transient computer-readable storage medium having instructions embodied thereon, the instructions being executable by one or more processors to perform operations for evaluating an accuracy of a human interpretation for a search query. The operations may include receiving, by one or more processing circuits, a training dataset. The training dataset may include multiple past search queries, a human interpretation for each of the multiple past search queries, and a human-evaluated label for each of the multiple past search queries of whether the human interpretation was correct. The operations may include training, by the one or more processing circuits, a first model utilizing the training dataset. The first model may be trained to evaluate whether a human interpretation for a search query is correct. The operations may include receiving, by the one or more processing circuits, a search query, the search query including one or more words input via a user interface to request desired information, and a human interpretation for the search query. The human interpretation may include one or more words defining an interpretation of the desired information. The operations may include determining, by the one or more processing circuits, an initial evaluation of whether the human interpretation for the search query is correct utilizing the first model. The operations may include generating, by the one or more processing circuits, a second model utilizing the initial evaluation from the first model, temporal features relating to the search query, and cluster features relating to the search query. The operations may include determining, by the one or more processing circuits, a final evaluation of whether the human interpretation for the search query is correct utilizing the second model.

In some implementations of the computer-readable storage medium, the search query may be a first search query. In some implementations of the computer-readable storage medium, the operations may include determining, by the one or more processing circuits, whether the first search query is associated with a second search query received within a predetermined time interval. In some implementations of the computer-readable storage medium, the operations may include receiving, by the one or more processing circuits, token embeddings from the first model for each of the first and second search queries. In some implementations of the computer-readable storage medium, a token may be a word in a search query. In some implementations of the computer-readable storage medium, the operations may include determining, by the one or more processing circuits, a vector sentence representation for each of the first and second search queries by averaging the token embeddings from the first model for each of the first and second search queries.

In some implementations of the computer-readable storage medium, the first model may be pre-trained on a set of natural language data, and training the first model utilizing the training dataset tunes the first model to a particular classification problem.

In some implementations of the computer-readable storage medium, the operations may include parsing, by the one or more processing circuits, the first and second search queries using a distance algorithm. In some implementations of the computer-readable storage medium, the distance algorithm may be at least one of a Euclidean distance algorithm or a cosine similarity algorithm.

In some implementations of the computer-readable storage medium, the operations may include determining, by the one or more processing circuits, whether the second search query is a search refinement of the first search query. In some implementations of the computer-readable storage medium, a search refinement may be a weighted indication of an incorrect human interpretation for the search query.

In some implementations of the computer-readable storage medium, the operations may include generating, by the one or more processing circuits, clusters of search queries based at least in part on similarity between search queries in the clusters. In some implementations of the computer-readable storage medium, the operations may include updating, by the one or more processing circuits, generated clusters in response to receiving new search queries.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
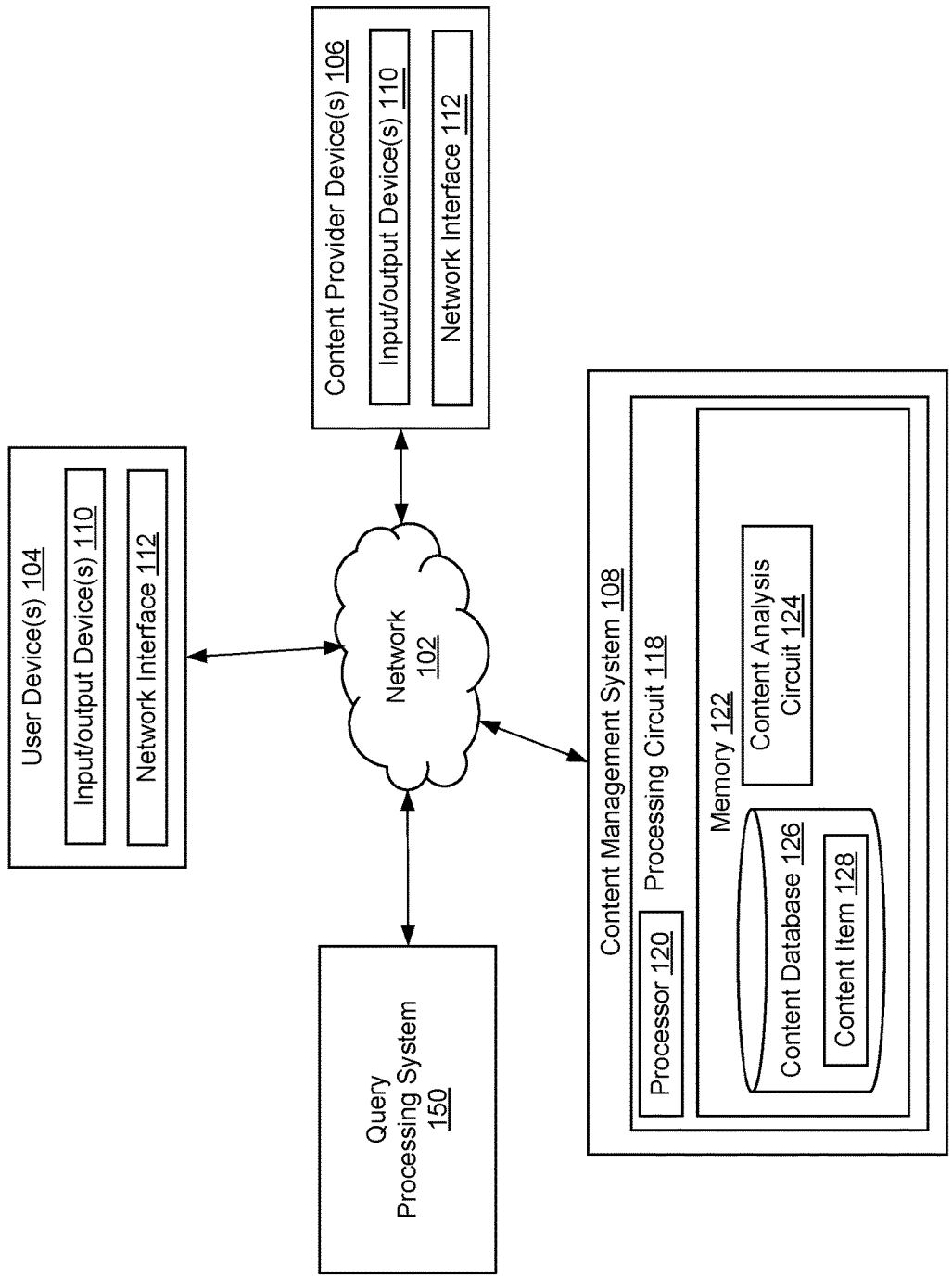
FIG. 1 is a block diagram of a system configured for evaluating an accuracy of a human interpretation for a search query and associated environment, according to an illustrative implementation.

Following below are more detailed descriptions of various concepts related to evaluating the quality of human interpretations for natural language search queries, and implementations of, methods, apparatuses, and systems for providing information using a computer network. The various concepts introduced above and discussed in greater detail below may be implemented in any of numerous ways, as the described concepts are not limited to any particular manner of implementation. Examples of specific implementations and applications are provided primarily for illustrative purposes.

Referring generally to the figures, various illustrative systems and methods for providing query results to a content provider are shown. More particularly, the present disclosure relates to systems and methods for evaluating an accuracy of a human interpretation for a search query (e.g., a natural language search query).

In order to produce quality data results for a search query, systems and methods depend on a correct interpretation of the type of information desired by the user from the search query. Therefore, the systems and methods described herein relate to a method for automatically evaluating whether a human interpretation of a natural language search query is a correct interpretation of the type of information desired. For example, a search query of "what page do people spend the most time on" has a correct human interpretation of "top page by average time on page." As another example, a search query of "slowest pages" may have an incorrect human interpretation of "bottom page by page views," and a correct human interpretation of "bottom page by average page load time."

In typical systems, user interface interactions, such as a selection of (e.g., clicking on) a specific result, are analyzed to determine whether a search query was correctly interpreted, therefore providing more relevant and accurate results. Yet in some systems, user interaction signals cannot be considered to determine the quality of an interpretation for a search query. For example, in some systems, a single, best result for the search query may be chosen and displayed in a results panel as soon as the user enters the search query. In other systems, manual input from humans are utilized to evaluate the quality of the answers to search queries. Using individuals to assess the accuracy of interpretations to search queries can require excessive amounts of time and costs. In addition, utilizing human evaluation for determining the quality of an interpretation for a search query is especially challenging as the amount of search queries increase to include several languages. Accordingly, more scalable, predictive methods are disclosed for assessing interpretations to beneficially decrease the time and costs needed in evaluating the quality of answers to natural language search queries.

Further, it is desirable to answer search queries in a manner that prevents the need for a user to enter a follow-up search query because the first search query was answered incorrectly. If a search query is inaccurately interpreted by a system, then another search query needs to be entered and processed in order to provide new results for the subsequent search query. This additional processing may waste precious server and network resources, causing greater inefficiencies in the overall computing system that may be increasingly costly in response to scaling the problem and solution to numerous languages. Considering the frequency of search queries that occur every second, avoiding re-entering search queries may prevent unnecessary network packets being sent and inefficient use of server time. Therefore, reducing the frequency of re-searching a previously entered search query may advantageously improve utilization of the network and bandwidth efficiencies. Additionally, methods for preventing the need for a user to enter a follow-up search query because the first search query was answered incorrectly may decrease the chances of a user abandoning the analytics service because of inaccurate results.

This predictive approach allows a natural language processing (NLP) model, such as a bidirectional encoder representations from transformers (BERT) model, to be pre-trained using a large body of language data, such as Wikipedia, and then to be further trained (i.e., fine-tuned) using datasets of search queries and interpretations for the search queries rated by humans for quality. After training the NLP model to evaluate whether a human interpretation for a search query is correct, the predictive method generates a new, final model, such as a logistic regression model, that is used to determine a final evaluation (e.g., prediction) of whether a human interpretation for a search query is correct. The NLP model is also used to embed search queries for clustering. These clusters features are then utilized as inputs for the final model, such as how often are search queries in a cluster issued on average, how many different users issued search queries in a cluster, and so on. The embeddings from the NLP model are further utilized to determine whether a similar search query is reissued within a small time period, along with other temporal features relating to the search query, which can be used as an indicator to evaluate that the original human interpretation for the search query was incorrect.

An advantage of fine-tuning the NLP model can be allowing a training dataset of search queries and human interpretations that are rated by humans to be small, while still resulting in an accurate model. The model can still maintain high-levels of accurate evaluations because the overall, pre-trained model can already effectively represent many NLP concepts. As such, the predictive method disclosed herein generates evaluations (e.g., predictions) that are still as accurate as in previous methods, but requires far less manual classification to train the model.

In the present disclosure, the terms "human interpretation", "interpretation", and "answer" to a search query are used interchangeably to refer to the interpretation of what information is desired from a search query. For example, a search query of "slowest pages" may have a given interpretation of "bottom page by page views." As another example, a search query of "country with most users" may have a given answer of "top country by users." Additionally, the terms "query," "search query," and "question" are used interchangeably herein to describe an input from a user for desired information in a single search.

For situations in which the systems discussed herein collect and/or utilize personal information about users, or may make use of personal information, the users may be provided with an opportunity to control whether programs or features may collect personal information (e.g., information about a user's social network, social actions or activities, a user's preferences, a user's current location, etc.), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. Further, the individual user information itself is not surfaced to the content provider, so the content provider cannot discern the interactions associated with particular users.

Referring now to FIG. 1, and in brief overview, a block diagram of a computing environment for evaluating an accuracy of a human interpretation for a search query (e.g., a natural language search query) is shown, according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access webpages (e.g., using an Internet browser), media files, and/or any other types of content. A content management system 108 may be configured to select content for display to users within resources (e.g., webpages, applications, etc.) and to provide content items 128 from a content database 126 to user devices 104 for display within the resources. The content items 128 from which content management system 108 selects may be provided by one or more content providers via network 102 using one or more content provider devices 106. In some implementations, the content management system 108 may select one or more content items 128 from one or more content providers among multiple content items from multiple content providers. In such implementations, the content management system 108 may determine content to be published in one or more content interfaces of resources (e.g., webpages, applications, etc.) shown on user devices 104 based at least in part on metrics or other characteristics of the content items or content providers.

Referring in greater detail to FIG. 1, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with input/output devices 110. For example, input devices may include one or more user input devices (e.g., keyboard, mouse, remote control, touchscreen, etc.). Input/output devices 110 may also include one or more display devices (e.g., television, monitor, CRT, plasma, LCD, LED, touchscreen, etc.) or other devices to output information to users of user devices 104 and/or users of content provider devices 106.

User devices 104 and/or content provider devices 106 may be configured to receive data from various sources using a network 102 via a network interface 112. In some implementations, the network 102 may include a computing network (e.g., LAN, WAN, Internet, etc.) to which the network interfaces 112 of user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, the network 102 may include a media distribution network, such as cable (e.g., coaxial metal cable), satellite, fiber optic, etc., configured to distribute media programming and/or data content.

In some implementations, the content management system 108 is configured to select third-party content items to be presented on a resource. Content management system 108 includes a processor 120, a processing circuit 118, and a memory 122. Memory 122 may have instructions stored thereon that, when executed by processor 120, cause processing circuit 118 to perform the various operations described herein. The operations described herein may be implemented using software, hardware, or a combination thereof. Processor 120 may include a microprocessor, ASIC, FPGA, etc., or combinations thereof. In many implementations, processor 120 may be a multi-core processor or an array of processors. Processor 120 may implement or facilitate secure environments. For example, processor 120 may implement software guard extensions (SGX) to define private regions (e.g., enclaves) in memory 122. Memory 122 may include, but is not limited to, electronic, optical, magnetic, or any other storage devices capable of providing processor 204 with program instructions. Memory 122 may include a floppy disk, CD-ROM, DVD, magnetic disk, memory chip, ROM, RAM, EEPROM, EPROM, flash memory, optical media, or any other suitable memory from which processor 204 can read instructions. The instructions may include code from any suitable computer programming language such as, but not limited to, C, C++, C#, Java, JavaScript, Perl, HTML, XML, Python and Visual Basic.

Memory 122 includes a content database 126 and a content analysis circuit 124. In some implementations, content analysis circuit 124 is configured to conduct an auction or bidding process. The content analysis circuit 124 may be configured to select one or more content items 128 of one or more winners of the auction or bidding process for display on the resource. In some implementations, content analysis circuit 124 is further configured to use a quality score (i.e., a measure of how likely a user of user device 104 is to interact with the content item 128 or take a conversion action related to the content item 128) or other metric during the process of selection of the content item 128. Content providers, in some implementations, may create a content campaign, or may otherwise provide various settings or guidelines to the content management system 108. Such settings or guidelines may govern how the content provider participates in the auction or bidding process (e.g., how much to bid in a given auction, a total budget (weekly, daily, or otherwise) for the content provider, etc.). Such settings or guidelines may be set based on various metrics, such as a cost per impression or cost per thousand impressions (CPM), a cost per click (CPC), or a cost per acquisition (CPA) or cost per conversion. Such settings or guidelines may further be set based on the type of platform on which a content item 128 should be provided (e.g., mobile, desktop, etc.), what type of resource on which a content item 128 should be provided (e.g., a search results page), a geographic location of the user device displaying the resource, and the like. In some implementations, the setting or guidelines provided to the content management system 108 are stored in the content database 126.

Query processing system 150 may facilitate evaluations of the accuracy of human interpretations for a search query. In various implementations, the query processing system 150 receives user interaction data from content provider devices 106 and/or user devices 104 from an analytics session. The query processing system 150 may also receive client data and content data for various client providers from the content management system 108. In some implementations, the query processing system 150 performs various functions on the session data and client data to generate an estimate of whether the provided human interpretation for a search query is correct. In various implementations, the query processing system 150 is a secure environment such that it does not allow access to non-anonymous data. The query processing system 150 may be a server, distributed processing cluster, cloud processing system, or any other computing device. The query processing system 150 may include or execute at least one computer program or at least one script. In various implementations, the query processing system includes combinations of software and hardware, such as one or more processors configured to execute one or more scripts. The query processing system 150 is described in greater detail below with reference to FIG. 2.

Figure 2:
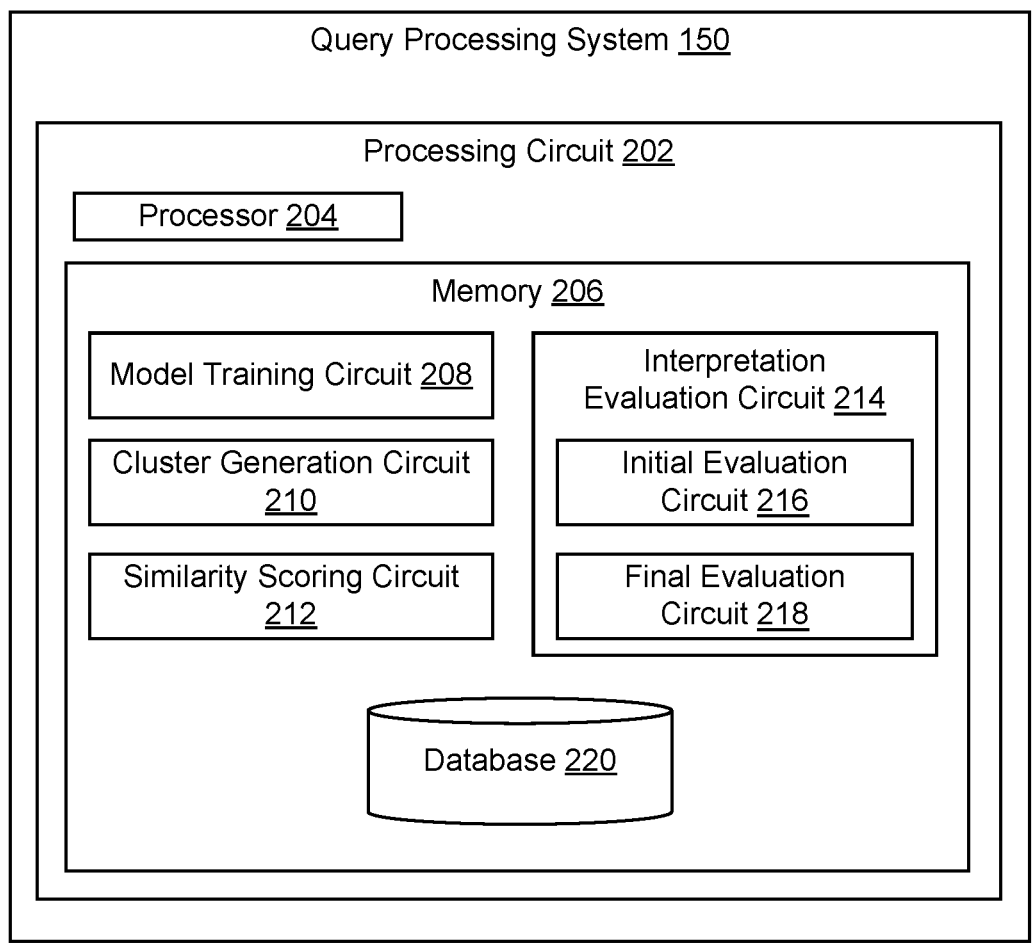
FIG. 2 is a block diagram of the system of FIG. 1 configured for evaluating an accuracy of a human interpretation for a search query, according to an illustrative implementation.

FIG. 2 shows a block diagram of the query processing system 150 configured for evaluating whether a human interpretation for a search query is correct, according to some implementations. The query processing system 150 is shown to include a processing circuit 202 having a processor 204 and a memory 206. Memory 206 may have instructions stored thereon that, when executed by processor 204, cause processing circuit 202 to perform the various operations described herein. The operations described herein may be implemented using software, hardware, or a combination thereof. Processor 204 may include a microprocessor, ASIC, FPGA, etc., or combinations thereof. In many implementations, processor 204 may be a multi-core processor or an array of processors. Processor 204 may implement or facilitate secure environments. For example, processor 204 may implement software guard extensions (SGX) to define private regions (e.g., enclaves) in memory 206. Memory 206 may include, but is not limited to, electronic, optical, magnetic, or any other storage devices capable of providing processor 204 with program instructions. Memory 206 may include a floppy disk, CD-ROM, DVD, magnetic disk, memory chip, ROM, RAM, EEPROM, EPROM, flash memory, optical media, or any other suitable memory from which processor 204 can read instructions. The instructions may include code from any suitable computer programming language such as, but not limited to, C, C++, C#, Java, JavaScript, Perl, HTML, XML, Python and Visual Basic. The memory 206 may include a model training circuit 208, a cluster generation circuit 210, a similarity scoring circuit 212, an interpretation evaluation circuit 214, and a database 220.

The model training circuit 208 may train a first model for generating an initial evaluation of the accuracy of a human interpretation. In various implementations, the model training circuit 208 receives training datasets that include sets of a search query, a provided human interpretation for the search query, and a human-labeled value of whether the interpretation was accurate. The model training circuit 208 may train the first model using the training datasets. Additionally, the model training circuit 208 may generate and train a second, final model by combining an output of an initial evaluation from the first model with one or more other inputs relating to the search query. For example, the model training circuit 208 may receive cluster data for search queries from the cluster generation circuit 210 to utilize in training the second model. In various implementations, the model training circuit 208 may utilize the first model as a service to generate token embeddings of search queries. The model training circuit 208 may then average the token embeddings of the search queries to generate a fixed vector sentence representation for each search query.

The cluster generation circuit 210 may determine cluster features relating to a search query, according to various implementations. The cluster generation circuit 210 may create new clusters for search queries, in addition to determining whether a search query should be grouped with existing clusters. In some implementations, the cluster generation circuit 210 is configured to apply a clustering technique such as K-Means clustering, density-based clustering, etc., to assign search queries to clusters. The cluster generation circuit 210 may control a size of one or more clusters based on whether clusters of "similar search queries" are desired, or whether clusters of "broad search query type" are desired. In some implementations, the cluster generation circuit 210 assigns more recent search queries to clusters first before assigning search queries that have been stored in the database 220 for an extended time. As such, the query processing system 150 may prioritize clustering and analyzing search queries that are more recent over search queries that were issued further in the past. In some implementations, the cluster generation circuit 210 assigns search queries to clusters as an added serving signal while connected to the network 102. In response to a connection to the network 102 going down (i.e., offline), the cluster generation circuit 210 may create dashboards of clusters using clustering outputs. Additionally, cluster generation circuit 210 may be configured to update the existing clusters in response to receiving new search queries.

The similarity scoring circuit 212 may receive vector sentence representations of search queries and determine a similarity score between two search queries. For example, the similarity scoring circuit 212 may utilize similarity methods, such as a cosine similarity algorithm, on vector sentence representations to calculate a value representing how similar a search query is to another search query. Additionally the similarity scoring circuit 212 may receive vector sentence representations from the model training circuit 208 of a search query and an associated, given interpretation to determine how similar the search query is to the given interpretation for the search query. The similarity scoring circuit 212 may calculate how similar a human interpretation is to the corresponding search query on a predetermined scale (e.g., 0 to 1, 0% to 100% similar, and so on). This calculation may then be used by the interpretation evaluation circuit 214 in evaluating whether the interpretation is correct. In various implementations, the similarity scoring circuit 212 also parses search queries in order to compare the similarities. The similarity scoring circuit 212 may then use a distance algorithm, such as a cosine distance algorithm or a Euclidean distance algorithm, to evaluate similarity between search queries and/or search queries and the given answers to the search queries.

The interpretation evaluation circuit 214 includes an initial evaluation circuit 216 and a final evaluation circuit 218, according to some implementations. The initial evaluation circuit 216 may utilize the first model trained by the model training circuit 208 to generate a first estimate of whether there was an explicit error in the interpretation for the search query. In some implementations, the initial evaluation circuit 216 may determine the first evaluation based on calculations from the similarity scoring circuit 212 and the cluster generation circuit 210. For example, if a user enters a search query that has been historically entered by a client over an extended period of time, then the frequency with which the user continues to enter the same question may be an indicator of a correct interpretation for the search query. The final evaluation circuit 218 may use the second, overall model generated and trained by the model training circuit 208 to determine an estimate of whether a human interpretation for a search query is correct. In some implementations, the final evaluation circuit 218 gives an estimate for the overall evaluation by assessing factors such as whether the user selected a report in an insights card for answers to search queries, and whether additional refining search queries were made after a first, original search query was issued. In various implementations, the final evaluation circuit 218 outputs the evaluation to one or more user devices 104. The final evaluation circuit 218 may also determine a confidence level of the overall evaluation. For example, the final evaluation circuit 218 may output either a 1 or 0 for whether the interpretation was accurate, along with a percentage for the confidence of the determination. In various implementations, the final evaluation circuit 218 weights factors such as whether a subsequent search refinement query was issued, and whether a user selected an option to view a report differently depending on configured settings for the query processing system 150.

The database 220 may save and update the search queries that may be used by the system disclosed herein. Furthermore, the database 220 may store the generated query clusters. In various implementations, the search queries do not include a date. For example, if a user enters a search query, such as "how many sessions occurred since November 2019," the date in the search query may be stripped and unconsidered by the query processing system 150. In other implementations, search queries with dates included in them are stored in the database 220 and used in evaluating the accuracy of a human interpretation for a search query. The database 220 may include one or more storage mediums. The storage mediums may include but are not limited to magnetic storage, optical storage, flash storage, and/or RAM. The query processing system 150 may implement or facilitate various APIs to perform database functions (i.e., managing data stored in database 220). The APIs can be but are not limited to SQL, ODBC, JDBC, and/or any other data storage and manipulation API.

In some implementations, the query processing system 150 may include one or more computing platforms configured to communicate with remote platforms according to a client/server architecture, a peer-to-peer architecture, and/or other architectures. Remote platforms may the same as or similar to user devices 104 described in connection with FIG. 1. Remote platforms may be configured to communicate with other remote platforms via computing platforms and/or according to a client/server architecture, a peer-to-peer architecture, and/or other architectures.

It should be appreciated that although circuits 208, 210, 212, 214, 216, and 218 are illustrated in FIG. 2 as being implemented within a single processing unit, in implementations in which processor 204 includes multiple processing units, one or more of circuits 208, 210, 212, 214, 216, and 218 may be implemented remotely from the other circuits. The description of the functionality provided by the different circuits 208, 210, 212, 214, 216, and 218 is for illustrative purposes, and is not intended to be limiting, as any of circuits 208, 210, 212, 214, 216, and 218 may provide more or less functionality than is described.

Figure 3:
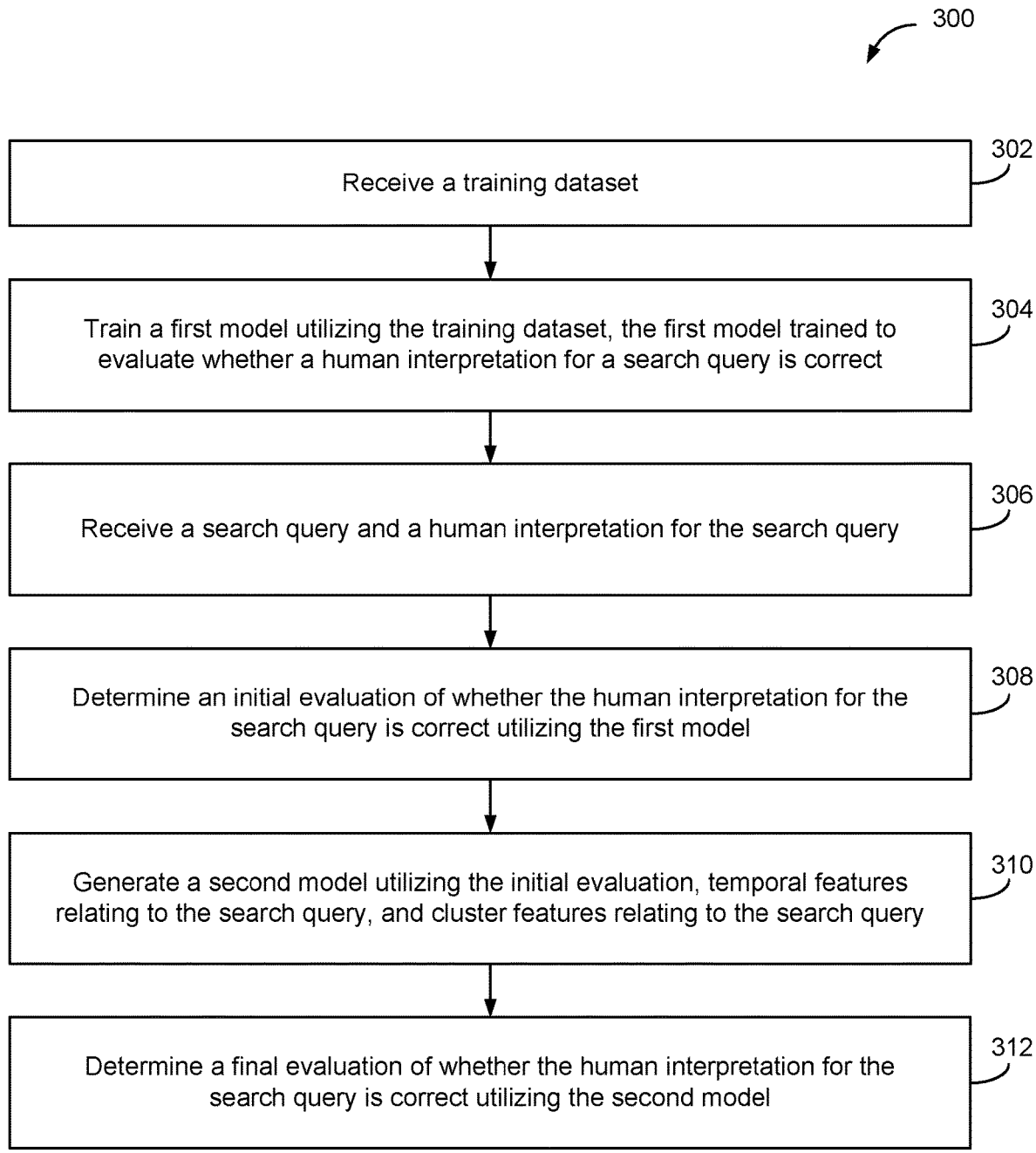
FIG. 3 is a flow diagram of a process for evaluating an accuracy of a human interpretation for a search query, according to an illustrative implementation.

Referring to FIG. 3, a flow diagram of a process 300 for evaluating an accuracy of a human interpretation for a search query is shown. Process 300 may be executed by, for example, query processing system 150 as described with reference to FIGS. 1-2. In some implementations, the process 300 is executed in response to a new search query being received by the query processing system 150.

FIG. 3 illustrates a process 300, in accordance with one or more implementations. The process 300 may be carried out by one or more components of the query processing system 150 in computing environment 100. At 302, the process 300 includes receiving, by one or more processing circuits, a training dataset. In some implementations, the model training circuit 208 is configured to execute the operations at 302. In other implementations, the operations described at 302 may be performed by one or more hardware processors configured by machine-readable instructions including a circuit that is the same as or similar to the model training circuit 208. The training dataset may include sets of a past search query, a human interpretation for the past search queries, and a human-evaluated label for whether the human interpretation was correct. As such, a training dataset may include three different types of data points that are associated, a past search query, a human interpretation, and a human-evaluated label. In some implementations, a past search query data can be associated with one or more human interpretations and the corresponding human-evaluated label. For example, a past search query of "slowest pages" can be associated with a human interpretation value of "bottom page by page views" and a human-evaluated label of an "incorrect" human interpretation. Additionally, the past search query "slowest pages" may also be associated with a human interpretation value of "bottom page by average page load time" and a human-evaluated label of a "correct" human interpretation in a different set within the training dataset.

In some examples, each set in the training dataset also includes a score of the results for the search query, a status of the results for the search query, whether a user selected to view reports in a results portion (e.g., insights card) of the search query, and/or whether the user selected a different suggested report. Furthermore, a set may include subsequent search queries and human interpretations within a small, predetermined time period of the labeled search query. For example, a set may also include a subsequent search query entered by a user after the labeled search query, an amount of time from the first search query that the subsequent search query was entered, the human interpretation of the subsequent search query, whether the subsequent search query was a search refinement of the original, first search query, and a similarity score with the original, first search query.

At 304, the process 300 includes training, by the one or more processing circuits, a first model utilizing the training dataset. The first model may be trained to evaluate whether a human interpretation for a search query is correct. In some implementations, the model training circuit 208 is configured to execute the operations described at 304. In other implementations, operations performed at 304 may be executed by one or more hardware processors configured by machine-readable instructions including circuits that are the same as or similar to the model training circuit 208. In some implementations, the first model is a bidirectional encoder representations from transformers (BERT) model. The first model may be initially pre-trained on a large corpus of language data, such as Wikipedia. In some implementations, the operations executed at 304 are for further training (i.e., fine-tuning) the first model to train the first model on the information from the received training dataset for a specific classifier. The first model may be trained to compute a direct evaluation on whether a human interpretation for a search query is correct. Additionally, the first model may be utilized as an embedding layer to compute similarities between search queries in clusters or in different clusters and similarities between a search query and subsequent search queries.

At 306, the process 300 includes receiving, by one or more processing circuits, a search query and a human interpretation for the search query. The search query includes one or more words input via a user interface to request desired information. The human interpretation may include one or more words defining an interpretation of the desired information. For example, a search query may be "how many users checkout?" and a human interpretation associated with that search query may be "number of product checkouts." In some implementations, the interpretation evaluation circuit 214 is configured to execute the operations at 306. The interpretation evaluation circuit 214 may receive the search query and the human interpretation for the search query from the content management system 108 via the network 102.

At 308, the process 300 includes determining, by the one or more processing circuits, an initial evaluation of whether the human interpretation for the search query is correct utilizing the first model. The operations described at 308 may be executed by the initial evaluation circuit 216, according to some implementations. The first model may be utilized by the initial evaluation circuit 216 to evaluate whether the human interpretation for the search query is correct by comparing the search query to the given answer. For example, the search query and the given interpretation may be input to the first model, and the first model may output the probability of the interpretation being an incorrect answer. The initial evaluation circuit 216 may analyze a similarity score for the inputted search query and the human interpretation calculated by the similarity scoring circuit 212 to make a first estimate. The initial evaluation circuit 216 may also receive a comparison of the search query with any potential refinements on the search query from the similarity scoring circuit 212 to determine whether a subsequent search query was a refinement of the first search query. For example, the similarity scoring circuit 212 may output a similarity between the search queries by comparing an average of the token embeddings (e.g., vector representations) of the first query and a subsequent search query from the model training circuit 208. Taking the average of the token embeddings of the search query and a subsequent search query may include an average pooling of the second-to-last hidden layers of each token in a sentence for the query to achieve a fixed representation of the sentence in the query.

At 310, the process 300 includes generating, by the one or more processing circuits, a second model utilizing the initial evaluation from the first model, temporal features relating to the search query, and cluster features relating to the search query. In some implementations, the model training circuit 208 is configured to execute the operations performed at 310. In some implementations, the second model generated and trained by the model training circuit 208 is a logistic regression model. The model training circuit 208 may receive an initial evaluation of whether the human interpretation is correct for the search query from the initial evaluation circuit 216. In various implementations, the model training circuit 208 receives the initial evaluation from the first model of whether the human interpretation is correct, along with session data, client data, and user data. Session data may include a duration of a session, a number of search queries entered during a session, the timing of each search query during the session, user interactions with results of search queries during the session (e.g., selections to view a report), etc. Client data may include information pertaining to the content provider, such as most commonly entered search queries for the client, data on the content provided by the client, past analytics results of the client, and so forth. In some implementations, user data includes information regarding a specific user of a content provider device (e.g., content provider device 106), such as past search queries entered by the user, average session time for the user, etc. The data provided as input to the second model to determine a final evaluation may be retrieved from the database 220, according to some implementations. In other implementations, the model training circuit 208 may receive inputs for the final, second model from the content management system 108 via the network 102.

The cluster features relating to the search query may include nearest clusters to the search query, whether a subsequent, second search query is in a cluster containing the search query, user data associated with search queries in the cluster containing the search query, or session data associated with search queries in the cluster containing the search query. For example, the model training circuit 208 may be configured to train the second model to analyze the number of different clusters a user enters search queries for during a session on average (e.g., the diversity of clusters), the variation of cluster membership by vertical, country, etc. (e.g., the segmentation of clusters), and the largest cluster in size among search queries with predicted explicit errors (e.g., the search queries that are answered incorrectly most frequently). Additionally, the clusters that have the lowest answer coverage among all search queries (e.g., search query growth), whether a subsequent search query issued by the user is in the same cluster as the previous search query (e.g., search refinements), the nearest clusters to a search query (e.g., alternative interpretations), and which search queries should be rated (e.g., sampling efficiency) may also be analyzed by the model training circuit 208 in training the second model. These cluster features related to the search query may be utilized by the second model generated and trained by the model training circuit 208 to determine whether the human interpretation for the search query is accurate or not.

In some implementations, temporal features relating to the search query include a frequency that the search query is issued within a past time period, a frequency that search queries in a cluster of the search query are issued, or a frequency that the search query is suggested as an input via the user interface. For example, a temporal feature relating to the search query may include a time between when the user made the search query and other search queries issued in a predetermined time period either before or after the search query. The temporal features relating to the search query may also include whether the search query was made by the user in a previous user session. For example, the model training circuit 208 may analyze whether the search query is a historical search query of the user that is stored in the database 220. In addition, the second model may be trained by the model training circuit 208 to consider the frequency that the user issues a search query in the past, on average, and the frequency that the user issues a search query in the same cluster as the search query in the past, on average. In some implementations, the model training circuit 208 uses additional inputs for generating and training the second model to make a final evaluation on the accuracy of the human interpretation for the search query.

At 312, the process 300 includes determining, by the one or more processing circuits, a final evaluation of whether the human interpretation for the search query is correct utilizing the second model. In some implementations, the operations performed at 312 may be executed by the final evaluation circuit 218. The final evaluation circuit 218 may use the second model to generate a final evaluation of whether the human interpretation is correct based on receiving similarity scores to subsequent search queries issued by the user from the similarity scoring circuit 212. Additionally, the final evaluation circuit 218 may consider user interactions with reports in a results area for the search query as indicators for whether the human interpretation is correct, described in greater detail below. In some implementations, the final evaluation is a value of 0 for a correct interpretation, or a value of 1 for an incorrect interpretation. The final evaluation determined by the second model, via the final evaluation circuit 318, may be associated with a confidence score, such as a percentage value for confidence that the second model did not make an error in its final evaluation. In other implementations, the final evaluation circuit 218 is configured to generate a final evaluation using the second model that is a probability that the human interpretation is correct for the search query. For example, the final evaluation circuit 218 may determine an output of 91% from the second model that the human interpretation for the search query is an accurate answer.

Figure 4:
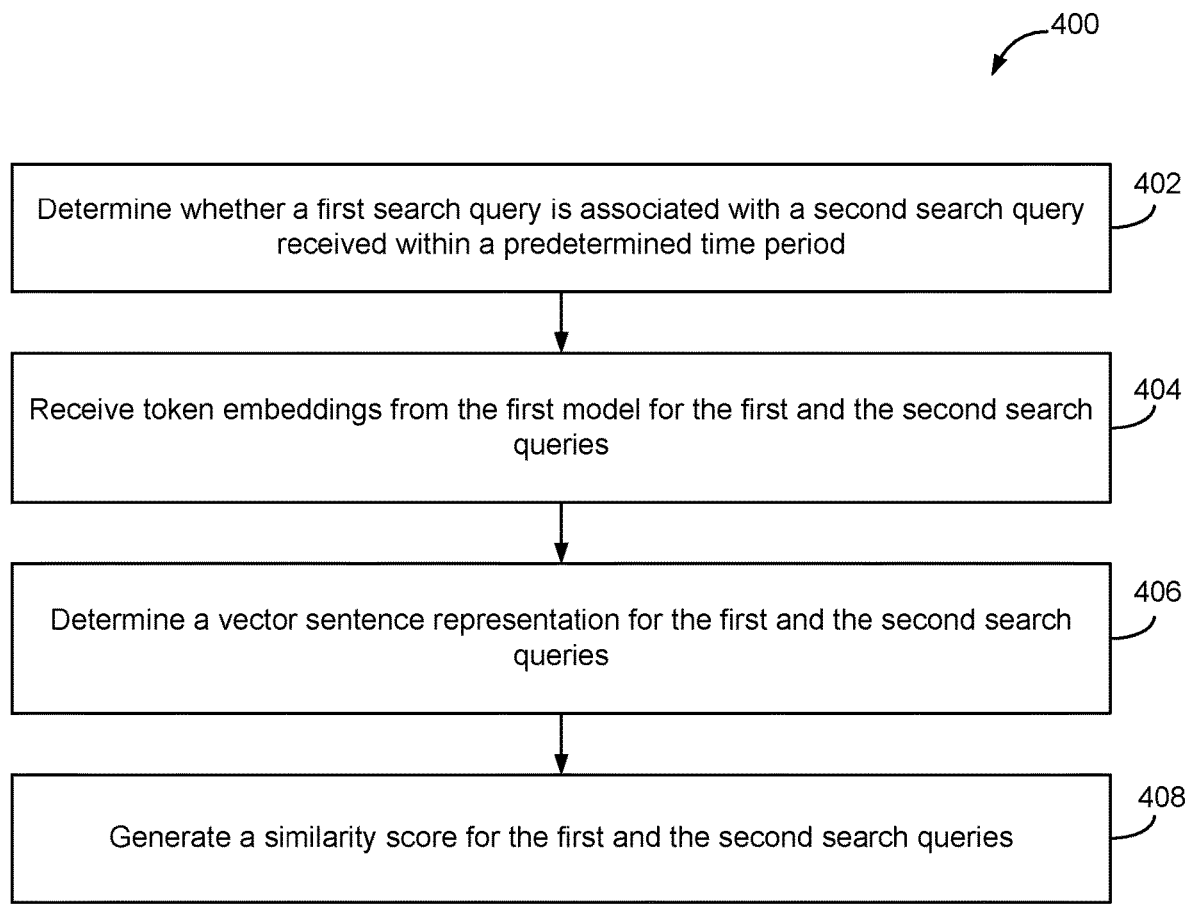
FIG. 4 is a flow diagram of a process for analyzing a search query to evaluate whether a human interpretation for the search query is an accurate interpretation, according to an illustrative implementation.

Referring now to FIG. 4, a flow diagram of a process 400 for analyzing a search query in order to evaluate whether a human interpretation for the search query is an accurate interpretation is shown. The process 400 may be executed by, for example, query processing system 150 as described with reference to FIGS. 1 and 2. FIG. 4 illustrates a process 400, according to one or more implementations. In some implementations, the process 400 is executed by the query processing system 150 during the operations executed at 312 during process 300 (FIG. 3).

At 402, the process 400 includes determining, by the one or more processing circuits, whether the first search query is associated with a second search query received within a predetermined time interval, according to some implementations. The cluster generation circuit 210 may be configured to execute the operations performed at 402. The cluster generation circuit 210 may determine whether an additional search query was entered by a user from a content provider device 106 after the original search query. For example, the search query with the human interpretation being evaluated for accuracy may be a first question from a user, and a second search query may be a follow-up question from the user. In some implementations, the cluster generation circuit 210 may receive session data relating to subsequent search queries from the database 220.

At 404, the process 404 includes receiving, by the one or more processing circuits, token embeddings from the first model for the first and second search queries, according to some implementations. The operations described at 404 may be executed by the model training circuit 208, according to some implementations. The model training circuit 208 may be configured to utilize the first model to generate the token embeddings for each search query analyzed by the query processing system 150. A token is a word in a search query. An embedding is a mathematical representation, e.g., a vector representation, of a word. As such, similar words have smaller distances between their respective embeddings. For example, a token embedding for the word "important" has a smaller distance to a token embedding for the word "significant" than a token embedding for the word "especially." The model training circuit 208 may then send the token embeddings for search queries to the similarity scoring circuit 212 to evaluate how similar a search query is to another search query, or how similar a search query is to the interpretation of the search query.

At 406, the process 400 includes determining, by the one or more processing circuits, a vector sentence representation for the first and second search queries, according to some implementations. The operations performed at 406 may be carried out by the model training circuit 208. The model training circuit 208 may take an average of the token embeddings from the first model for each of the first and second search queries in order to generate a vector sentence representation for each of the first and second search queries. For example, the first model may use average pooling of the token embeddings (i.e., vector representations) for each search query to determine a fixed representation of the sentence in the search query. The vector sentence representations for search queries may then be utilized in order to generate similarity scores between the search queries by the similarity scoring circuit 212.

At 408, the process 400 includes generating, by the one or more processing circuits, a similarity score for the first and second search queries, according to some implementations. The similarity scoring circuit 212 may be configured to perform the operations executed at 408. The similarity score may be generated by the first model utilizing a similarity based metric (e.g., a cosine similarity calculation, a Jaccard similarity calculation, etc.) on the vector sentence representations. In some implementations, the similarity score ranges from a value of 0 to 1, with 0 occurring when the vector sentence representations are the same. In other implementations, the similarity score may be generated, by the similarity scoring circuit 212, on a different scale or as a percent value. In some implementations, the similarity scoring circuit 212 may also be configured to utilize the first model to parse the first and second search queries to determine a similarity between the search queries using a distance algorithm, such as a cosine distance algorithm or Euclidean distance algorithm.

Figure 5:
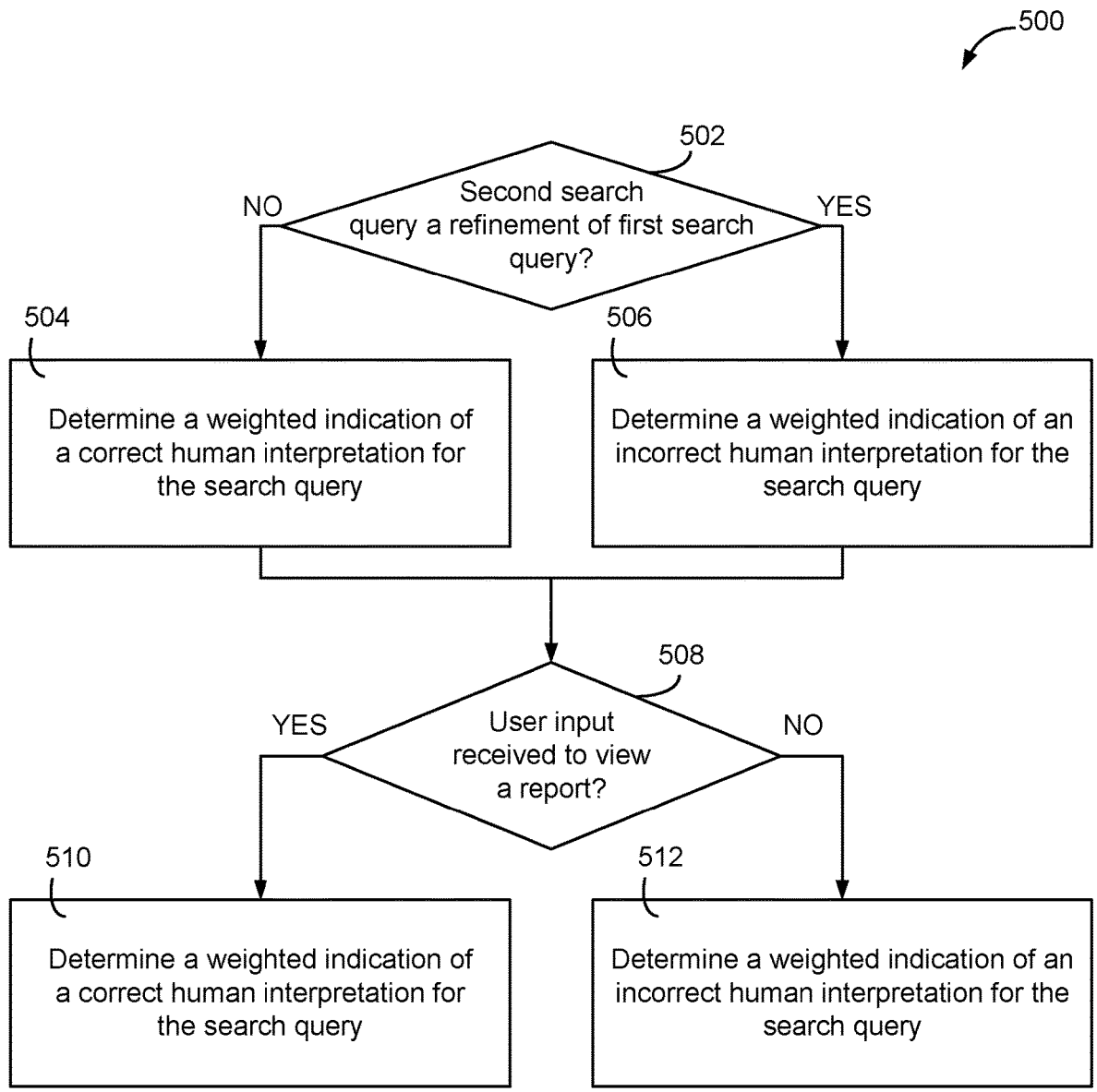
FIG. 5 is a flow diagram of a process utilized for evaluating an accuracy of a human interpretation for a search query, according to an illustrative implementation.

Turning now to FIG. 5, a flow diagram of a process 500 that is used for evaluating an accuracy of a human interpretation for a search query is shown, according to exemplary implementations. The process 500 may be executed by, for example, by the query processing system 150 as described with reference to FIGS. 1-2. The process 500 may be carried out in response to the operations at 408, with reference to FIG. 4, being executed. At 502, the model training circuit 208 may determine whether the second search query is a search refinement of the first search query. The model training circuit 208 may conclude whether the subsequent search query is a search refinement of the first search query based on the value of the similarity score between the search queries from the similarity scoring circuit 212. For example, if the similarity score calculated at 408 in process 400 is below a predetermined threshold, the model training circuit 208 may determine the second search query is not a search refinement of the original search query. If the model training circuit 208 determines at 502 that the second search query is not a search refinement, then the process 500 continues to 504. At 504, the final evaluation circuit 218 determines a weighted indication of a correct human interpretation for the search query, according to some implementations. For example, if the two vector sentence representations of the search queries have a high similarity score, indicating the vectors are very different, the final evaluation circuit 218 may evaluate the second search query is an unrelated follow-up question, and therefore, an indication that the interpretation of the first search query is correct.

However, if at 502 the model training circuit 208 determines the second search query is a search refinement of the first search query, then the process 500 proceeds to 506. For example, if the similarity score between the first search query and the subsequent search query is above a predetermined threshold (e.g., 0.8, 75%, etc.), the second model, via the model training circuit 208, determines the subsequent search query is a search refinement of the first search query and the process 500 proceeds to 506. At 506, the final evaluation circuit 218 determines a weighted indication of an incorrect human interpretation for the search query, according to some implementations. For example, if the first search query is "slowest pages," with an interpretation of "bottom page by page views," and a subsequent search query is "slowest loading pages," the final evaluation circuit 218 determines a weighted indication that the interpretation "bottom page by page views" may be an incorrect interpretation. The indication is a weighted, feature input to the second model in determining the overall evaluation. In some implementations, the final evaluation circuit 208 is configured to train the second model to weigh the indication determined at 502 a predetermined amount in a evaluation of whether the interpretation for the search query was correct, along with other factors. As such, the final evaluation of whether the interpretation for the search query was correct is based on a trained weighting of the indication and other feature inputs (e.g., historical search query and human interpretation data).

At 508, the process 500 may include determining whether an input is received to view a report for the search query, according to some implementations. The final evaluation circuit 218 may be configured to receive session data from the database 220 that includes information on user interactions during the session the search query was issued. For example, the final evaluation circuit 218 may receive data indicating the user selected, via a user interface (e.g., user interface 900 (FIG. 9)) of a content provider device 106 or user device 104, an option to view a report in a results area for the search query. In some implementations, the final evaluation circuit 218 may instead receive the session data from the cluster generation circuit 210 or the model training circuit 208. In some implementations, the final evaluation circuit 218 may also be configured to determine whether a user selected an option to view other suggested reports in the results area of the search query at 412.

If the final evaluation circuit 218 determines at 508 that a user input was received to view a report displayed in the results area for the search query, the process 500 proceeds to 510. At 510, the final evaluation circuit 218 determines a weighted indication of a correct human interpretation for the search query, according to some implementations. The indication from a user input to view a report in the results area may be weighed more heavily by the final evaluation circuit 218 than other factors in evaluating whether the interpretation is correct. In other implementations, whether a user inputs a subsequent search query that is a search refinement of the first search query may be weighed more heavily by the final evaluation circuit 218.

On the other hand, if at 508 the final evaluation circuit 218 determines a user input was not received to view a report for the search query, the process 500 proceeds to 512. At 512, the final evaluation circuit 218 may determine a weighted indication of an incorrect human interpretation for the search query. In some implementations, the indications determined at 510 and at 512 may not have an equal impact on the final evaluation made by the second model of whether the interpretation was accurate or not. For example, receiving a user input to view a report may have a greater impact on (i.e., the second model may be trained to weigh more heavily) the final evaluation made by the final evaluation circuit 218 than not receiving a user input.

Figure 6:
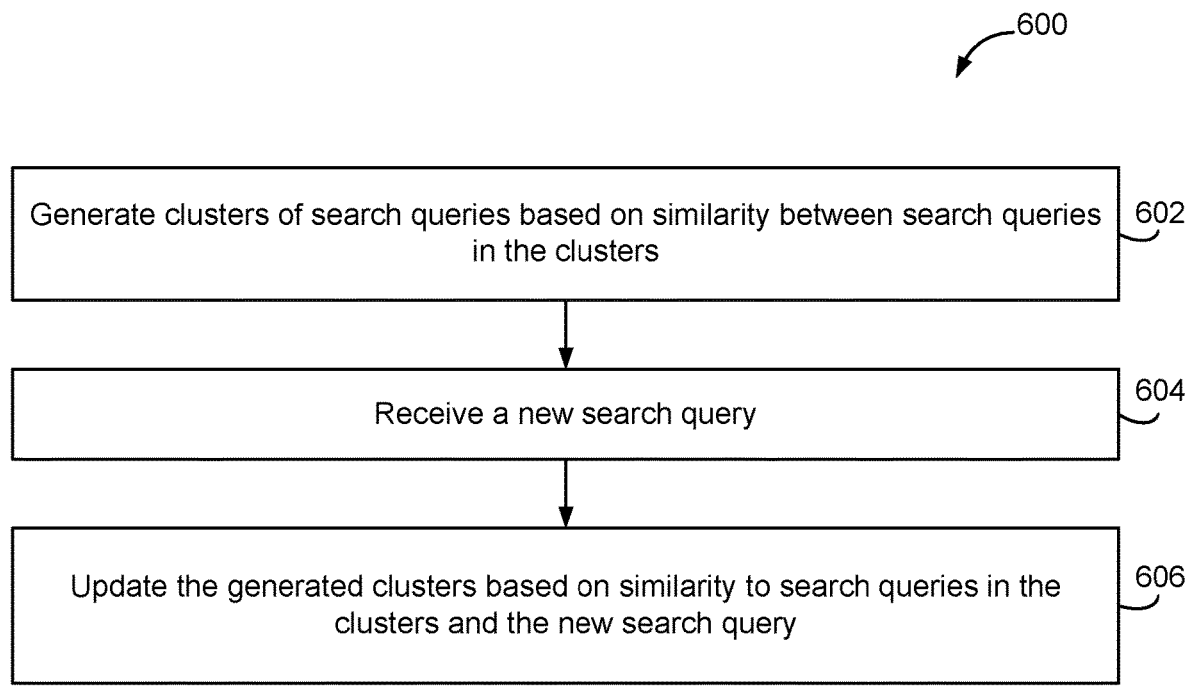
FIG. 6 is a flow diagram of a process for utilizing clusters to evaluate accuracy of the human interpretation for the search query, according to an illustrative implementation.

Referring now to FIG. 6, a flow diagram of a process 600 for utilizing clusters to evaluate accuracy of the human interpretation for the search query is shown, according to some implementations. The query processing system 150 as described with reference to FIGS. 1 and 2 may execute the process 600. In some implementations, the process 600 is executed by the query processing system 150 after the operations at 302 and 304, with reference to FIG. 3, are executed. At 602, the process 600 includes generating clusters of search queries based at least in part on similarity between search queries in the clusters. In some implementations, the cluster generation circuit 210 may be configured to receive vector sentence representations for search queries generated by the first model from the model training circuit 208. The cluster generation circuit 210 may then use a given clustering technique to assign the search queries to clusters. In some implementations, the clustering techniques use large values of k to cluster semantically similar search queries.

At 604, the cluster generation circuit 210 may be configured to receive a new search query, according to some implementations. The cluster generation circuit 210 may receive a new search query from the database 220, from another component of the processing circuit 202, or from the content management system 108, for example. In some implementations, the new search query is a past search query that is being sorted into a cluster. At 606, the process 600 includes updating the generated clusters based on similarity to search queries in the clusters and the new search query. The cluster generation circuit 210 may be configured to sort the new search query into a cluster based on a similarity score (e.g., as described at 408 with reference to FIG. 4) with the other search queries in the cluster. In some implementations, the cluster generation circuit 210 is configured to search for and discover new clusters, in addition to assigning incoming search queries and corresponding interpretations to existing clusters. The cluster generation circuit 210 may generate cluster dashboards using a clustering output in order to allow clusters to be accessed both online and offline. In some implementations, while disconnected from the network 102, the cluster generation circuit 210 creates dashboards for clusters. However, while connected to the network 102, the cluster generation circuit 210 may continuously assign search queries to clusters as an additional serving signal.

In some embodiments, the dashboards created depict various categorizations of errors that are automatically generated by the overall model, via the cluster generation circuit 210. Beneficially, the methods disclosed herein may allow a user to view which search queries have the highest percentage of human interpretation errors and related search queries. For example, the clusters determined by the cluster generation circuit 210 are used for reporting purposes, such as reporting a search has a percentage of human interpretation errors for search queries in cluster A. Cluster A may be characterized by search queries that have a similarity to the top ten most popular search queries in the cluster. As such, information on which human interpretations are generating the most errors can be determined. Typically, humans are used to manually evaluate how to classify different search queries to generate statistics about the search queries and to use for reporting details about human interpretation errors. Advantageously, the systems and methods disclosed herein facilitate automatic classification of the search queries and errors in the human interpretations.

Figure 7:
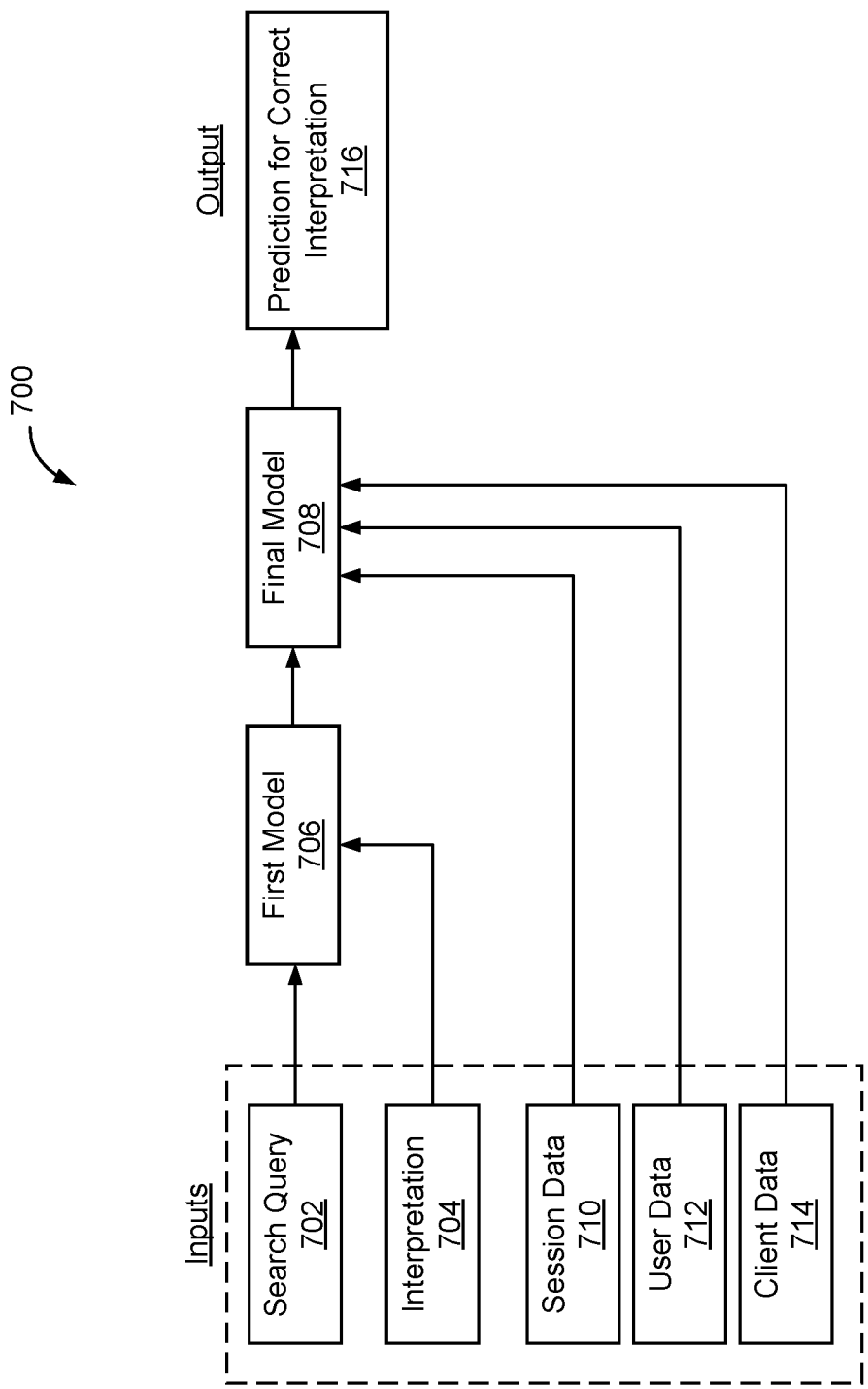
FIG. 7 is a block diagram of inputs and an output for a first model and a final model utilized by the system of FIG. 1, according to an illustrative implementation.

Referring now to FIG. 7, a diagram 700 of a high level modeling flow of the overall model used by the query processing system described in FIGS. 1 and 2 is shown, according to some implementations. The diagram 700 shows the inputs and the output of the overall model for evaluating an accuracy of a human interpretation for a natural language search query utilized by the query processing system 150. The inputs include a search query 702, an interpretation 704, session data 710, user data 712, and client data 714. The search query 702 may be entered via a user interface via single search. Single search is the search bar for users to enter queries in an analytics application. The interpretation 704 is a human interpretation of the search query 702, meaning that the interpretation 704 is a human language interpretation of what the user wants displayed as results in an insights card (e.g., insights card 908 of FIG. 9) on the user interface. The methods disclosed herein focus on evaluating whether explicit error occurred for the search query 702 and the interpretation 704 (i.e., the interpretation 704 is a wrong interpretation for the search query 702). The search query 702 and the interpretation 704 are used as inputs for the first model 706.

In some implementations, the first model 706 is a BERT model. The first model 706 may support fine-tuning after the first model 706 is pre-trained over a vast corpus of language data, and then specialized over a smaller corpus of human-rated language data for a particular classification problem. This is beneficial because the first model 706 then needs less manually-evaluated, human rating data, which is expensive to collect, in order to make a evaluation. Furthermore, fine-tuning the first model 706 may beneficially increase efficiency and improve the bandwidth of the system, as a smaller amount of human labeled training sets may be used to specialize the first model 706. The session data 710, the user data 712, and the client data 714, along with the output of an initial evaluation of whether the interpretation is accurate from the first model, are used as inputs for the final model 708. The session data 710 may include information on other search queries entered during the session, frequency of entered search queries, etc. The user data 712 may include statistics for a particular user, such as the average amount of search queries the user issues during a session. In some implementations, the client data 714 may include information regarding the overall client (e.g., a content provider company), such as the type of content the client provides, the most common type of search queries entered for the client, and the like. The final model 708 may be a combined model that uses the first model 706, in addition to various cluster features and temporal features relating to the search query 702, to identify a evaluation for correct interpretation 716. The evaluation for correct interpretation 716 is an estimate of whether the interpretation 704 for the search query 702 is accurate or whether explicit error occurred for the interpretation 704.

Figure 8:
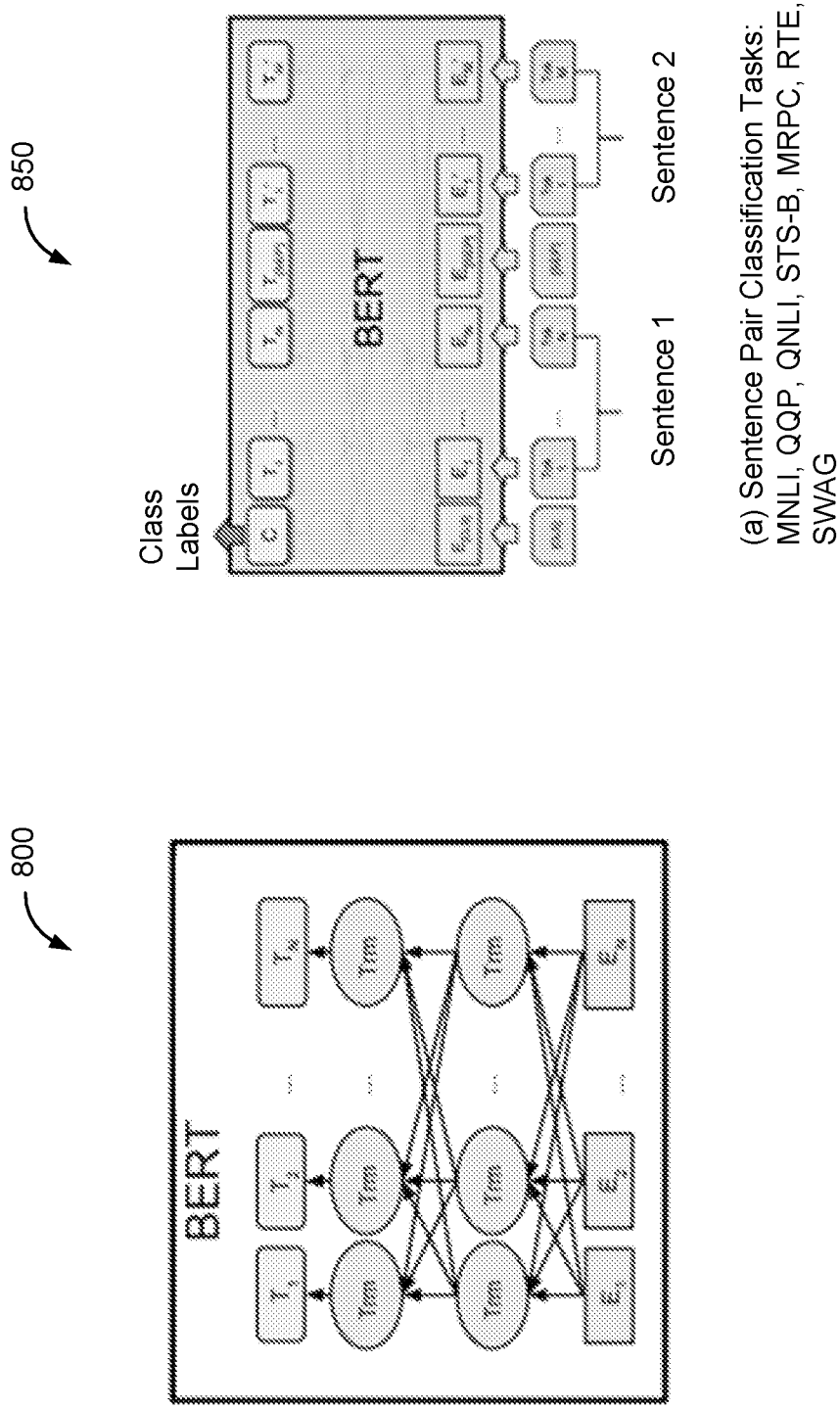
FIG. 8 is a diagram of a structure of the first model utilized by the system of FIG. 1, according to an illustrative implementation.

Turning now to FIG. 8, a model architecture for the first model 706 and a use case for the first model 706 are shown, according to some implementations. FIG. 8 is shown to include a diagram 800 of the architecture for the first model 706 and a diagram 850 for the particular use case of the first model 706 utilized in the systems and methods disclosed herein. The diagram 800 shows the bidirectional transformer architecture of the first model 706. $E_k$ represents a token (i.e., a word, roughly) and $T_k$ represents numeric vectors, which are representation of each input token in (bidirectional) context. $T_{rm}$ represents the transformer cells. The first model 706, as a BERT model, can learn jointly from information on left and right context in all layers, encode the words into vectors, and output numeric vectors corresponding to words. The first model 706 can utilize a mechanism called self-attention, as opposed to sequence mechanisms like in recurrent neural networks (RNNs). For a transformer cell, each word may be assigned 3 vectors, a key, a value, and a query. The elements of each of these vectors is learned by the first model 706. Each word may then "query" every other word by calculating the dot product between its query and the other words' keys. This may then result in a weight for each word for each query. For each query, the transformer cell returns the weighted average of value vectors.

Therefore, the output of each transformer cell is a vector for every word or query, which is then passed to a feed forward neural network. The process then repeats several times depending on the size of the first model 706.

The diagram 850 of the use case for the first model 706 depicts the fine-tuning (i.e., transfer learning) capabilities of first model 706. A special token is utilized in the use case for sentence classification, which is useful if there is a downstream task for the first model 706 to learn. The diagram 850 shows the incorporation of the first model 706 (e.g., BERT) with an additional output layer. Advantageously, a minimal number of parameters are then used by the model to begin learning. In the diagram 850, E represents the input embedding, $T_i$ represents the contextual representation of token i, [CLS] represents the special symbol for classification output, and [SEP] is the special symbol to separate non-consecutive token sequences. The fine-tuning of the first model 706 pools data in a single output token. Once the output token has been created, the final model can use the vector representation of the classification output as input and the corresponding label to train.

Figure 9:
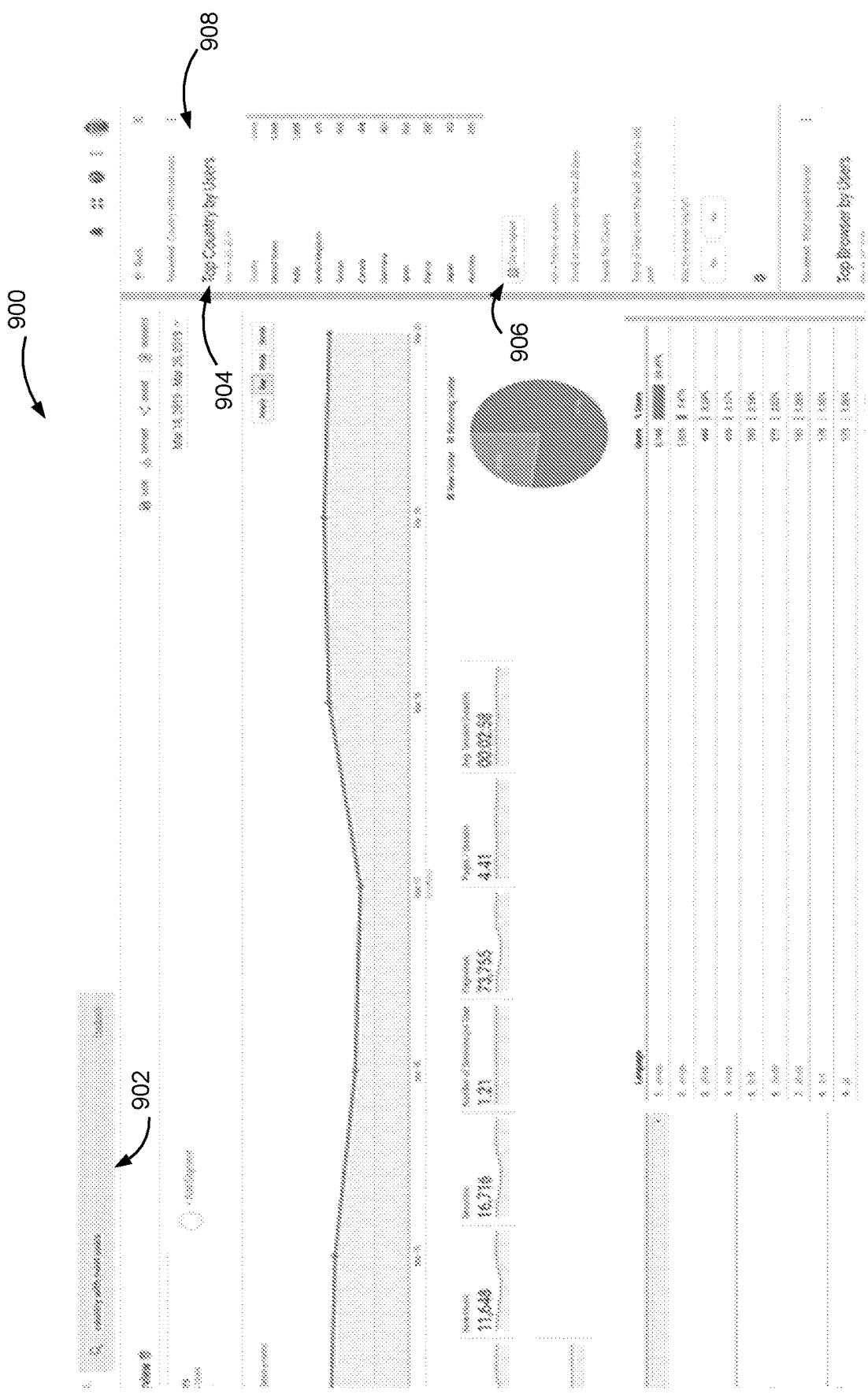
FIG. 9 is a user interface for entering a search query and viewing the human interpretation and results of the search query, according to an illustrative implementation.

Referring now to FIG. 9, a user interface for entering a search query and viewing the human interpretation and results data for the search query is shown, according to some implementations. The user interface 900 is shown to include a single search 902, a human interpretation 904, a selectable report option 906, and an insights card 908. The single search 902 may be a search bar for users to enter a search query to view analytics data on content provided by the content management system 108. In some implementations, the single search 902 auto-fills with suggestions for search queries based on common search queries entered by the user in past sessions. In this exemplary implementation, the search query entered is "country with most users" and the corresponding human interpretation 904 is "top country by users," shown in the insights card 908. The selectable report option 906 may allow the user to view a generated report by selecting a link displayed in the insights card 908. The insights card 908 is a results area displayed to the user in a right panel where insight results are shown for an entered search query. In some implementations, the insights card 908 displays an option to view other suggested reports. The insights card 908 may also allow a user to select an option to ask a follow-up question (i.e., enter a subsequent search query).

Figure 10:
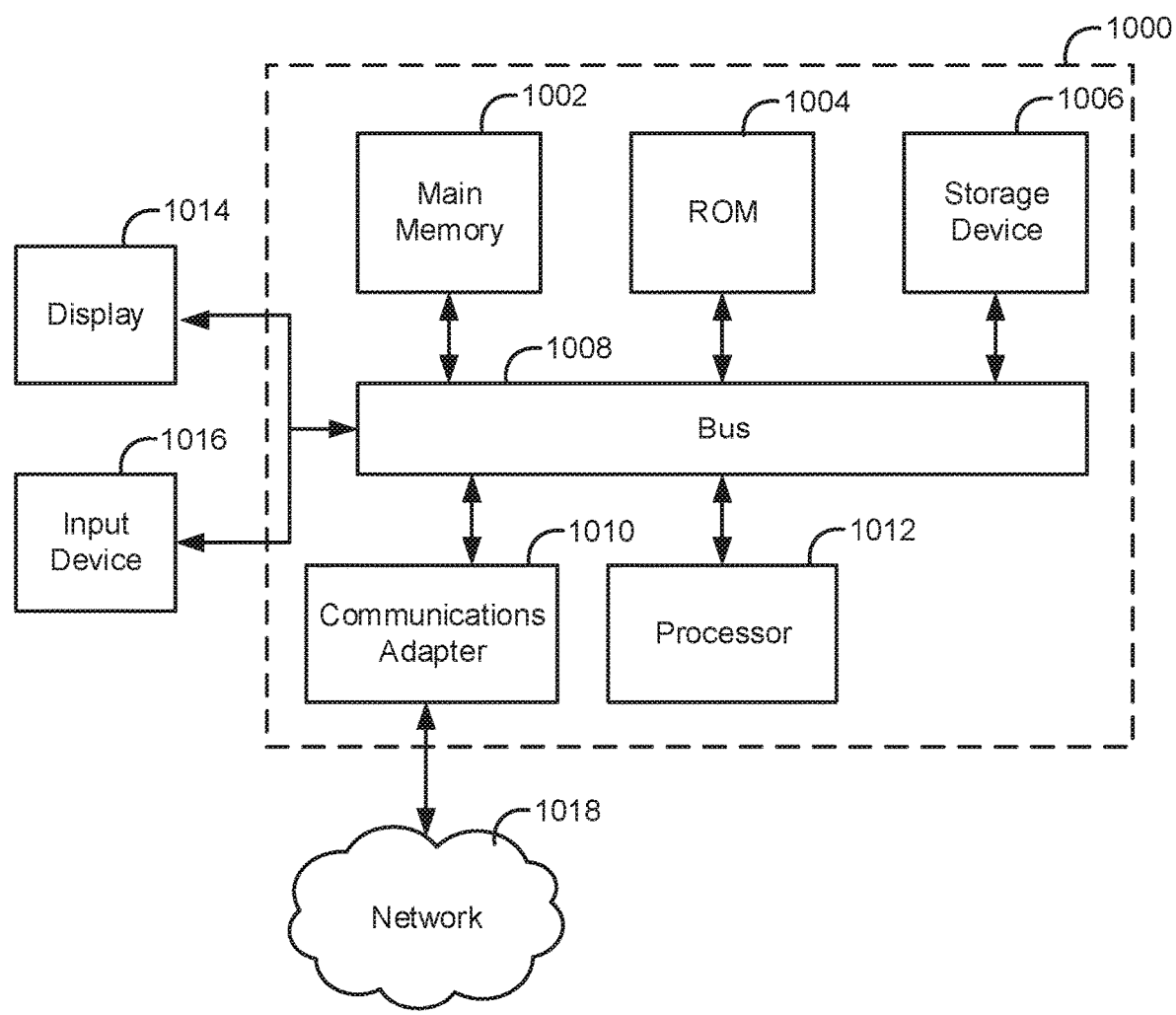
FIG. 10 is a block diagram of a computing system, according to an illustrative implementation.

FIG. 10 illustrates a depiction of a computing system 1000 that can be used, for example, to implement an illustrative user device 104, an illustrative content management system 108, an illustrative content provider device 106, an illustrative query processing system 150, and/or various other illustrative systems described in the present disclosure. Computing system 1000 includes a bus 1008 or other communication component for communicating information and a processor 1012 coupled to bus 1008 for processing information. Computing system 1000 also includes main memory 1002, such as a random access memory (RAM) or other dynamic storage device, coupled to bus 1008 for storing information, and instructions to be executed by processor 1012. Main memory 1002 can also be used for storing position information, temporary variables, or other intermediate information during execution of instructions by processor 1012. Computing system 1000 may further include a read only memory (ROM) 1004 or other static storage device coupled to bus 1008 for storing static information and instructions for processor 1012. A storage device 1006, such as a solid state device, magnetic disk or optical disk, is coupled to bus 1008 for persistently storing information and instructions.

Computing system 1000 may be coupled via bus 1008 to a display 1014, such as a liquid crystal display, or active matrix display, for displaying information to a user. An input device 1016, such as a keyboard including alphanumeric and other keys, may be coupled to bus 1008 for communicating information, and command selections to processor 1012. In another implementation, input device 1016 has a touch screen display 1014. Input device 1016 can include a cursor control, such as a mouse, a trackball, or cursor direction keys, for communicating direction information and command selections to processor 1012 and for controlling cursor movement on display 1014.

In some implementations, computing system 1000 may include a communications adapter 1010, such as a networking adapter. Communications adapter 1010 may be coupled to bus 1008 and may be configured to enable communications with a computing or communications network 1018 and/or other computing systems. In various illustrative implementations, any type of networking configuration may be achieved using communications adapter 1010, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 1000 in response to processor 1012 executing an arrangement of instructions contained in main memory 1002. Such instructions can be read into main memory 1002 from another computer-readable medium, such as storage device 1006. Execution of the arrangement of instructions contained in main memory 1002 causes computing system 1000 to perform the illustrative processes described herein. One or more processors in a multi-processing arrangement may also be employed to execute the instructions contained in main memory 1002. In alternative implementations, hard-wired circuitry may be used in place of or in combination with software instructions to implement illustrative implementations. Thus, implementations are not limited to any specific combination of hardware circuitry and software.

The systems and methods as described in the present disclosure may be implementable for any type of third-party content item (i.e., for any type of content item to be displayed on a resource). In one implementation, the content items may include advertisements. In one implementation, the content items may include any text, images, video, stories (e.g., news stories), social media content, links, or any other type of content provided by a third-party for display on the resource of a first-party content provider. The type of content item for which the content visibility methods herein are used for is not limiting.

Although an example processing system has been described in FIG. 10, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more subsystems of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing apparatus" or "computing device" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for evaluating an accuracy of a human interpretation for a search query, the method comprising:
    receiving, by one or more processing circuits, a training dataset, the training dataset comprising a plurality of past search queries, a human interpretation for each of the plurality of search queries, and a human-evaluated label for each of the plurality of past search queries of whether the human interpretation was correct;
    training, by the one or more processing circuits, a first machine-learned model utilizing the training dataset, wherein the first machine-learned model is trained to evaluate whether a human interpretation for a search query is correct;
    receiving, by the one or more processing circuits, a search query, the search query comprising one or more words input via a user interface to request desired information, and a human interpretation for the search query, the human interpretation comprising one or more words defining an interpretation of the desired information;
    determining, by the one or more processing circuits, an initial evaluation of whether the human interpretation for the search query is correct utilizing the first machine-learned model;
    generating, by the one or more processing circuits, a second machine-learned model utilizing the initial evaluation from the first machine-learned model, temporal features relating to the search query, and cluster features relating to the search query by:
        receiving cluster data for the search queries from a cluster generation circuit; and
        training the second machine-learned model using the cluster data; and
    determining, by the one or more processing circuits, a final evaluation of whether the human interpretation for the search query is correct utilizing the second machine-learned model.

2. The method of claim 1, wherein the search query is a first search query, and wherein the method further comprises;
    determining, by the one or more processing circuits, whether the first search query is associated with a second search query received within a predetermined time interval after the first search query;

receiving, by the one or more processing circuits, token embeddings from the first machine-learned model for each of the first and second search queries, wherein a token is a word in a search query; and determining, by the one or more processing circuits, a vector sentence representation for each of the first and second search queries by averaging the token embeddings from the first machine-learned model for each of the first and second search queries.

3. The method of claim 2, wherein the first machine-learned model is pre-trained on a set of natural language data, and wherein training the first machine-learned model utilizing the training dataset tunes the first machine-learned model to a particular classification problem.

4. The method of claim 2, further comprising:

parsing, by the one or more processing circuits, the first and second search queries using a distance algorithm, wherein the distance algorithm is at least one of a Euclidean distance algorithm or a cosine similarity algorithm.

5. The method of claim 2, further comprising:

determining, by the one or more processing circuits, whether the second search query is a search refinement of the first search query, wherein a search refinement is a weighted indication of an incorrect human interpretation for the search query.

6. The method of claim 1, further comprising:

generating, by the one or more processing circuits, clusters of search queries of different sizes based at least in part on similarity between search queries in the clusters; and updating, by the one or more processing circuits, generated clusters in response to receiving new search queries.

7. The method of claim 1, further comprising:

determining, by the one or more processing circuits, whether an input is received via the user interface to view a report for the search query, wherein the input to view a report is a weighted indication of a correct human interpretation for the search query.

8. A system configured for evaluating an accuracy of a human interpretation for a search query, the system comprising:

one or more hardware processors configured by machine-readable instructions to:

receive, by one or more processing circuits, a training dataset, the training dataset comprising a plurality of past search queries, a human interpretation for each of the plurality of search queries, and a human-evaluated label for each of the plurality of past search queries of whether the human interpretation was correct;

train, by the one or more processing circuits, a first machine-learned model utilizing the training dataset, wherein the first machine-learned model is trained to evaluate whether a human interpretation for a search query is correct;

receive, by the one or more processing circuits, a search query, the search query comprising one or more words input via a user interface to request desired information, and a human interpretation for the search query, the human interpretation comprising one or more words defining an interpretation of the desired information;

determine, by the one or more processing circuits, an initial evaluation of whether the human interpretation for the search query is correct utilizing the first machine-learned model;

generate, by the one or more processing circuits, a second machine-learned model utilizing the initial evaluation from the first machine-learned model, temporal features relating to the search query, and cluster features relating to the search query by:

receiving cluster data for the search queries from a cluster generation circuit; and training the second machine-learned model using the cluster data; and determine, by the one or more processing circuits, a final evaluation of whether the human interpretation for the search query is correct utilizing the second machine-learned model.

9. The system of claim 8, wherein the search query is a first search query, wherein the one or more hardware processors are further configured by machine-readable instructions to:

determine, by the one or more processing circuits, whether the first search query is associated with a second search query received within a predetermined time interval after the first search query;

receive, by the one or more processing circuits, token embeddings from the first machine-learned model for each of the first and second search queries, wherein a token is a word in a search query; and determine, by the one or more processing circuits, a vector sentence representation for each of the first and second search queries by averaging the token embeddings from the first machine-learned model for each of the first and second search queries.

10. The system of claim 9, wherein the first machine-learned model is pre-trained on a set of natural language data, and wherein training the first machine-learned model utilizing the training dataset tunes the first machine-learned model to a particular classification problem.

11. The system of claim 9, wherein the one or more hardware processors are further configured by machine-readable instructions to:

parse, by the one or more processing circuits, the first and second search queries using a distance algorithm, wherein the distance algorithm is at least one of a Euclidean distance algorithm or a cosine similarity algorithm.

12. The system of claim 9, wherein the one or more hardware processors are further configured by machine-readable instructions to:

determine, by the one or more processing circuits, whether the second search query is a search refinement of the first search query, wherein a search refinement is a weighted indication of an incorrect human interpretation for the search query.

13. The system of claim 8, wherein the one or more hardware processors are further configured by machine-readable instructions to:

generate, by the one or more processing circuits, clusters of search queries of different sizes based at least in part on similarity between search queries in the clusters; and update, by the one or more processing circuits, generated clusters in response to receiving new search queries.

14. The system of claim 8, wherein the one or more hardware processors are further configured by machine-readable instructions to:

determine, by the one or more processing circuits, whether an input is received via the user interface to view a report for the search query, wherein the input to view a report is a weighted indication of a correct human interpretation for the search query.

15. A non-transient computer-readable storage medium having instructions embodied thereon, the instructions being executable by one or more processors to perform operations for evaluating an accuracy of a human interpretation for a natural language search query, the operations comprising:
receiving, by one or more processing circuits, a training dataset, the training dataset comprising a plurality of past search queries, a human interpretation for each of the plurality of search queries, and a human-evaluated label for each of the plurality of past search queries of whether the human interpretation was correct;
training, by the one or more processing circuits, a first machine-learned model utilizing the training dataset, wherein the first machine-learned model is trained to evaluate whether a human interpretation for a search query is correct;
receiving, by the one or more processing circuits, a search query, the search query comprising one or more words input via a user interface to request desired information, and a human interpretation for the search query, the human interpretation comprising one or more words defining an interpretation of the desired information;
determining, by the one or more processing circuits, an initial evaluation of whether the human interpretation for the search query is correct utilizing the first machine-learned model;
generating, by the one or more processing circuits, a second machine-learned model utilizing the initial evaluation from the first machine-learned model, temporal features relating to the search query, and cluster features relating to the search query by:
receiving cluster data for the search queries from a cluster generation circuit; and
training the second machine-learned model using the cluster data; and
determining, by the one or more processing circuits, a final evaluation of whether the human interpretation for the search query is correct utilizing the second machine-learned model.

16. The computer-readable storage medium of claim 15, wherein the search query is a first search query;
wherein the operations comprise determining, by the one or more processing circuits, whether the first search query is associated with a second search query received within a predetermined time interval after the first search query;
wherein the operations comprise receiving, by the one or more processing circuits, token embeddings from the first machine-learned model for each of the first and second search queries, wherein a token is a word in a search query; and
wherein the operations comprise determining, by the one or more processing circuits, a vector sentence representation for each of the first and second search queries by averaging the token embeddings from the first machine-learned model for each of the first and second search queries.

17. The computer-readable storage medium of claim 16, wherein the first machine-learned model is pre-trained on a set of natural language data, and wherein training the first machine-learned model utilizing the training dataset tunes the first machine-learned model to a particular classification problem.

18. The computer-readable storage medium of claim 16, wherein the operations further comprises:
parsing, by the one or more processing circuits, the first and second search queries using a distance algorithm, wherein the distance algorithm is at least one of a Euclidean distance algorithm or a cosine similarity algorithm.

19. The computer-readable storage medium of claim 16, wherein the operations further comprises:
determining, by the one or more processing circuits, whether the second search query is a search refinement of the first search query, wherein a search refinement is a weighted indication of an incorrect human interpretation for the search query.

20. The computer-readable storage medium of claim 15, wherein the operations further comprises:
generating, by the one or more processing circuits, clusters of search queries of different sizes based at least in part on similarity between search queries in the clusters; and
updating, by the one or more processing circuits, generated clusters in response to receiving new search queries.

* * * * *